(12) United States Patent
Line et al.

(10) Patent No.: US 9,126,504 B2
(45) Date of Patent: Sep. 8, 2015

(54) INTEGRATED THIN FLEX COMPOSITE HEADREST ASSEMBLY

(71) Applicant: Ford Global Technologies, LLC, Dearborn, MI (US)

(72) Inventors: Johnathan Andrew Line, Northville, MI (US); Daniel Ferretti, Commerce Township, MI (US); John W. Jaranson, Deearborn, MI (US); Grant A. Compton, Livonia, MI (US); Kendrick Alden Harper, Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 13/749,572

(22) Filed: Jan. 24, 2013

(65) Prior Publication Data

US 2014/0203614 A1    Jul. 24, 2014

(51) Int. Cl.
*A47C 7/36* (2006.01)
*B60N 2/48* (2006.01)
*B60N 2/02* (2006.01)
(Continued)

(52) U.S. Cl.
CPC ............ *B60N 2/0232* (2013.01); *B60N 2/0252* (2013.01); *B60N 2/22* (2013.01); *B60N 2/34* (2013.01); *B60N 2/449* (2013.01);
(Continued)

(58) Field of Classification Search
CPC .... B60N 2/0232; B60N 2/4838; B60N 2/643; B60N 2/22; B60N 2/449; B60N 2/0252; B60N 2/34; B60N 2205/30; B60N 2002/445

USPC .......... 297/284.2, 221, 391, 408, 219.1, 222, 297/220, 353

See application file for complete search history.

(56) References Cited

U.S. PATENT DOCUMENTS

| | | | | |
|---|---|---|---|---|
| 1,125,155 A | * | 1/1915 | Nunn | ............................ 33/3 B |
| 2,958,369 A | | 11/1960 | Pitts et al. | |

(Continued)

FOREIGN PATENT DOCUMENTS

| | | |
|---|---|---|
| EP | 0754590 | 1/1997 |
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Milton Nelson, Jr.
(74) *Attorney, Agent, or Firm* — Vichit Chea; Price Heneveld LLP

(57) ABSTRACT

A vehicle headrest assembly includes a head restraint operably coupled to a vehicle seatback and having a head support surface. A flexible member includes a top portion operably coupled to the head restraint. The flexible member includes an intermediate portion adjacent the head support surface, a lower portion, and an upper back support disposed on the vehicle seatback and defining an elongated slot through which the flexible member extends. An actuation system is operably coupled to the lower portion of the flexible member. The actuation system operates to move the flexible member through the slot between a deployed position and a non-deployed position.

18 Claims, 9 Drawing Sheets

(51) Int. Cl.
*B60N 2/64* (2006.01)
*B60N 2/22* (2006.01)
*B60N 2/44* (2006.01)
*B60N 2/34* (2006.01)

(52) U.S. Cl.
CPC ............. *B60N 2/4838* (2013.01); *B60N 2/643* (2013.01); *B60N 2002/445* (2013.01); *B60N 2205/30* (2013.01)

(56) References Cited

U.S. PATENT DOCUMENTS

| | | | |
|---|---|---|---|
| 3,018,133 A * | 1/1962 | Mills | 297/397 |
| 3,403,938 A | 10/1968 | Cramer et al. | |
| 3,929,374 A | 12/1975 | Hogan et al. | |
| 4,324,431 A | 4/1982 | Murphy et al. | |
| 4,334,709 A | 6/1982 | Akiyama et al. | |
| 4,353,595 A | 10/1982 | Kaneko et al. | |
| 4,541,669 A | 9/1985 | Goldner | |
| 4,629,248 A | 12/1986 | Mawbey | |
| 4,718,723 A * | 1/1988 | Bottemiller | 297/265.1 |
| 4,720,141 A | 1/1988 | Sakamoto et al. | |
| 4,790,592 A * | 12/1988 | Busso et al. | 297/184.11 |
| 4,915,447 A | 4/1990 | Shovar | |
| 4,971,380 A * | 11/1990 | Cote et al. | 296/63 |
| 5,171,062 A | 12/1992 | Courtois | |
| 5,174,526 A | 12/1992 | Kanigowski | |
| 5,443,303 A * | 8/1995 | Bauer et al. | 297/408 |
| 5,518,294 A | 5/1996 | Ligon, Sr. et al. | |
| 5,560,681 A | 10/1996 | Dixon et al. | |
| 5,647,635 A | 7/1997 | Aumond et al. | |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,951,039 A | 9/1999 | Severinski et al. | |
| 6,024,406 A | 2/2000 | Charras et al. | |
| 6,062,642 A | 5/2000 | Sinnhuber et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,364,414 B1 | 4/2002 | Specht | |
| 6,375,269 B1 | 4/2002 | Maeda et al. | |
| 6,382,720 B1 * | 5/2002 | Franklin et al. | 297/228.13 |
| 6,394,546 B1 | 5/2002 | Knoblock et al. | |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,344,189 B2 | 3/2008 | Reed et al. | |
| 7,350,859 B2 | 4/2008 | Klukowski | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,547,068 B2 * | 6/2009 | Davis | 297/353 |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 2004/0183351 A1 * | 9/2004 | Johnson et al. | 297/302.3 |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2007/0120401 A1 | 5/2007 | Minuth et al. | |
| 2008/0174159 A1 | 7/2008 | Kojima et al. | |
| 2009/0066122 A1 | 3/2009 | Minuth et al. | |
| 2009/0322124 A1 | 12/2009 | Barkow et al. | |
| 2010/0038937 A1 | 2/2010 | Andersson et al. | |
| 2010/0140986 A1 | 6/2010 | Sawada | |
| 2010/0187881 A1 | 7/2010 | Fujita et al. | |
| 2010/0201167 A1 | 8/2010 | Wieclawski | |
| 2010/0231013 A1 | 9/2010 | Schlenker | |

(56) References Cited

U.S. PATENT DOCUMENTS

| | | |
|---|---|---|
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |

FOREIGN PATENT DOCUMENTS

| | | | |
|---|---|---|---|
| EP | 1266794 | | 3/2004 |
| EP | 1123834 | | 10/2004 |
| EP | 1050429 | | 10/2005 |
| EP | 1084901 | | 6/2006 |
| EP | 1674333 | | 8/2007 |
| EP | 1950085 | | 12/2008 |
| EP | 1329356 | | 11/2009 |
| GB | 2011254 A | * | 7/1979 |
| WO | WO9511818 | | 5/1995 |
| WO | WO9958022 | | 11/1999 |
| WO | WO2006131189 | | 12/2006 |
| WO | WO2007028015 | | 8/2007 |
| WO | WO2008073285 | | 6/2008 |
| WO | WO2011021952 | | 2/2011 |
| WO | WO2012008904 | | 1/2012 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.Com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages

* cited by examiner

US 9,126,504 B2

INTEGRATED THIN FLEX COMPOSITE HEADREST ASSEMBLY

FIELD OF THE INVENTION

The present invention generally relates to a vehicle headrest assembly, and more particularly to an integrated thin flex seat rest composite headrest assembly.

BACKGROUND OF THE INVENTION

Vehicle seating assemblies commonly include a headrest assembly coupled with an upper portion of the seatback to support a passenger's head. In some instances, the headrest assemblies may include posts extending from the headrest to the seatback, allowing the headrest to be adjusted up and down relative to the seatback. Accordingly, these seating assemblies have limited adjustability to support the passenger's head.

SUMMARY OF THE INVENTION

According to one aspect of the present invention, a vehicle headrest assembly includes a headrest operably coupled to a vehicle seatback. The headrest has a head support surface. A flexible member includes a top portion operably coupled to the headrest. The flexible member also includes an intermediate portion adjacent the head support surface and a lower portion. An upper back support is disposed on the vehicle seatback and defines an elongate slot through which the flexible member extends. An actuation system is operably coupled to the lower portion of the flexible member. The actuation system operates to move the flexible member through the slot between a deployed position and a non-deployed position.

According to another aspect of the present invention, a vehicle headrest assembly includes a headrest operably coupled to a vehicle seatback. A flexible member includes a top portion operably coupled to the headrest, an intermediate portion, and a lower portion. An actuation system is operably coupled to the lower portion of the flexible member. The actuation system operates to move the flexible member between a deployed position and a non-deployed position.

According to yet another aspect of the present invention, a vehicle headrest includes a body portion having a head support surface. A flexible member includes a top portion operably coupled to the body portion, a flexible intermediate portion proximate the head support surface, and a lower portion operably coupled to an actuation system. Operation of the actuation system moves the flexible intermediate portion of the flexible member a predetermined distance away from the head support surface.

These and other aspects, objects, and features of the present invention will be understood and appreciated by those skilled in the art upon studying the following specification, claims, and appended drawings.

DETAILED DESCRIPTION OF THE EMBODIMENTS

Figures 1, 2:
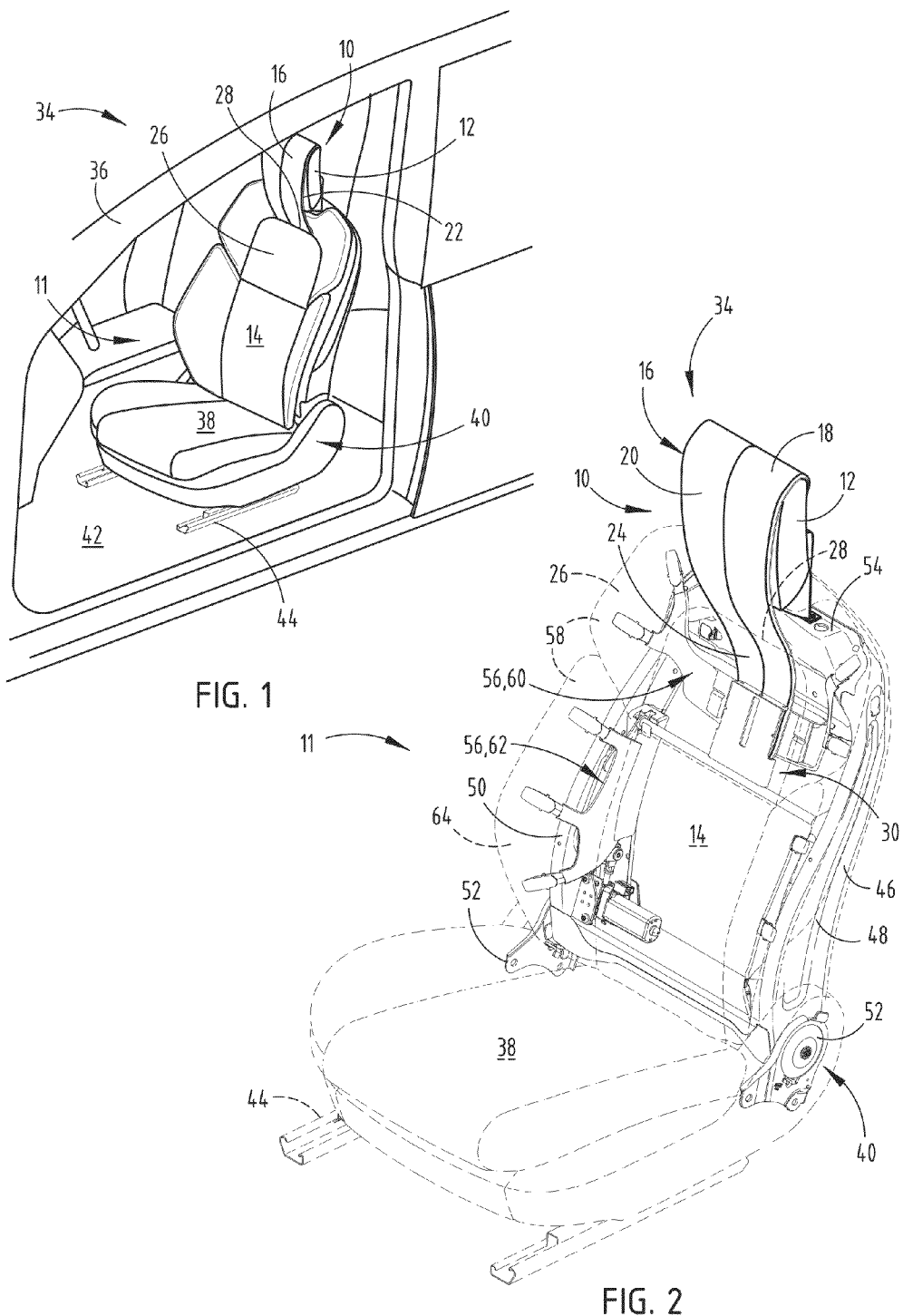
FIG. 1 is a top perspective view of a vehicle seating assembly in a vehicle.
FIG. 2 is a top perspective view of a headrest assembly having portions of the vehicle seating assembly shown in dashed lines.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-9, reference numeral 10 generally designates a vehicle headrest assembly that includes a headrest 12 operably coupled to a vehicle seatback 14. A flexible member 16 includes a top portion 18 operably coupled to the headrest 12. The flexible member 16 includes an intermediate portion 20 adjacent a head support surface 22 of the headrest 12 and a lower portion 24. An upper back support 26 is disposed on the vehicle seatback 14 and defines an elongated slot 28 through which the flexible member 16 extends. An actuation system 30 is operably coupled to the lower portion 24 of the flexible member 16. The actuation system 30 operates to move the flexible member 16 through the slot 28 between a deployed position 32 and a non-deployed position 34.

Referring now to FIG. 1, the vehicle seating assembly 11 is positioned in a driver's side location of a vehicle 36. The vehicle seating assembly 11 includes a seat 38 that is pivotally coupled with the seatback 14 about a recliner mechanism 40 for pivotally adjusting the seatback 14 relative to the seat 38. The seat 38 is slideably coupled with a floor 42 of the vehicle 36 about a track assembly 44. The track assembly 44 is configured to allow the vehicle seating assembly 11 to adjust in a forward and rearward direction relative to the vehicle 36. It is understood that the vehicle seating assembly 11 may be positioned at various positions throughout the vehicle 36 other than the illustrated position, such as a passenger side location, a mid-row location, and a rear seat location. It is also conceivable that the seat 38 may not include the track assembly 44 and may be fixedly or alternatively coupled with the floor 42 of the vehicle 36.

As shown in the embodiment illustrated in FIG. 2, the seatback 14 of the vehicle seating assembly 11 includes a seatback structure 46 with a first side support 48 and a second side support 50 extending upward in general parallel alignment from a recliner bracket 52 to couple with a top support 54 of the seatback structure 46 extending therebetween. The first and second side supports 48, 50 pivotally couple with the recliner brackets 52 about a recliner mechanism 40 that is configured to adjustably lock the seatback 14 at various pivoted angles relative to the seat 38. The top support 54 of the seatback structure 46 extends generally orthogonally between the first and second side supports 48, 50. The headrest 12 of the headrest assembly 10 couples with the top support 54 of the seatback structure 46 and is centrally positioned between the first and second side supports 48, 50. It is also conceivable that headrest 12 may be integrated with the side supports 48, 50 and/or the top support 54 of the seatback structure 46 to provide a similar configuration.

As also illustrated in FIG. 2, the seatback 14 includes a suspension assembly 56 coupled between the first and second side supports 48, 50 and extending forward to engage a passenger support 58. The suspension assembly 56 has an upper suspension component 60 proximate the top support 54 of the seatback structure 46 and a lower suspension component 62 between the upper suspension component 60 and the recliner brackets 52. The upper and lower suspension components 60, 62 extend forward to couple, respectively, with the upper back support 26 of the passenger support 58 and a lower back support 64 of the passenger support 58. The flexible member 16 of the headrest assembly 10 extends down from the headrest 12 to couple with a pivot bar 68 of the upper suspension component 60, as described in more detail below.

Figures 3, 4:
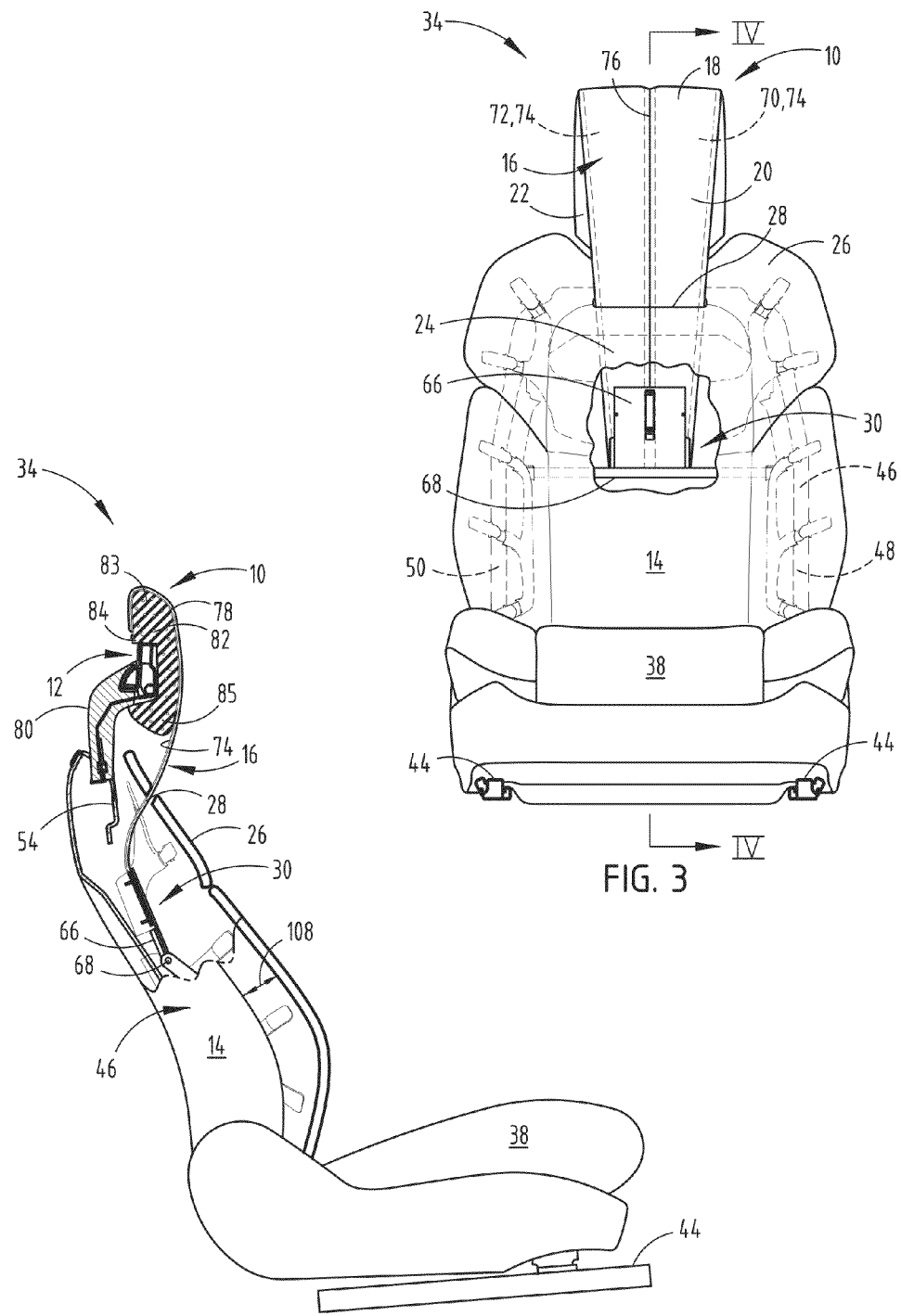
FIG. 3 is a front elevational view of the headrest assembly, having a portion of an upper back support cutaway showing a lower portion of a flexible member.
FIG. 4 is a side elevational view of the headrest assembly, having a portion of the vehicle seating assembly and the headrest assembly shown as a cross section taken at line IV-IV of FIG. 3.

As shown in FIG. 3, the flexible member 16 of the headrest assembly 10 extends through the elongated slot 28 in the upper back support 26 to couple with the actuation system 30. More specifically, the intermediate portion 20 of the flexible member 16 extends over the head support surface 22 of the headrest 12, above the elongated slot 28. The lower portion 24 of the flexible member 16 couples with a central bracket 66, below the elongated slot 28. The central bracket 66 is connected to the pivot bar 68 that extends between the first and second side supports 48, 50 of the seatback structure 46. The flexible member 16 generally tapers in width from the top portion 18 to the intermediate portion 20 and to the lower portion 24, as it extends down through the elongated slot 28. As shown, the flexible member 16 includes a first resilient element 70 and a second resilient element 72 extending independently alongside each other from the headrest 12 to the pivot bar 68. As such, the first and second resilient elements 70, 72 are separated by an intermediate slit 76 that is defined by a space between the first and second resilient elements 70, 72. The intermediate slit 76 between the first and second resilient elements 70, 72 provides an indentation configured to cradle a passenger's head resting against the flexible member 16. It is conceivable that the flexible member 16 may include more or fewer of the resilient elements 70, 72 shown in the illustrated embodiment. The first and second independent resilient elements 70, 72 each include an elongated spring steel element 74. However, it is contemplated that the resilient elements 70, 72 may include elongated elements having a polymer material or another conceivable flexible material.

A cover stock portion 78, as shown in FIG. 4, is disposed over the elongated spring steel elements 74 of the flexible member 16, connecting the first and second resilient elements 70, 72 (FIG. 3) and providing a cushioned support to the passenger's head. The cover stock portion 78 may conceivably include a fabric material, a leather material, a vinyl material, or other vehicle upholstery materials as generally understood in the art. It is also contemplated that the cover stock portion 78 may be disposed separately over the individual resilient elements, allowing the intermediate slit 76 to extend between the flexible member 16 to the head support surface.

As illustrated in FIG. 4, the headrest 12 of the headrest assembly 10 includes a support column 80 coupled with and extending from the top support 54 of the seatback structure 46 to operably couple with a body portion 82 of the headrest 12. The flexible member 16 operably couples with a rear wall 84 of the body portion 82 and wraps over a top edge 83 of the body portion 82 to extend down over the head support surface 22 of the body portion 82. The flexible member 16 spans from the lower edge 85 of the headrest 12 to curve in a somewhat S-shape curvature through the elongated slot 28 in the upper seatback 14. Upon passing though the elongated slot 28, the flexible member 16 engages a rear surface of the central bracket 66 that is coupled with the pivot bar 68. It is conceivable that flexible member 16 may be alternatively arranged with the actuation system 30 to move the flexible member 16 through the slot 28, as further described below.

Figure 4A:
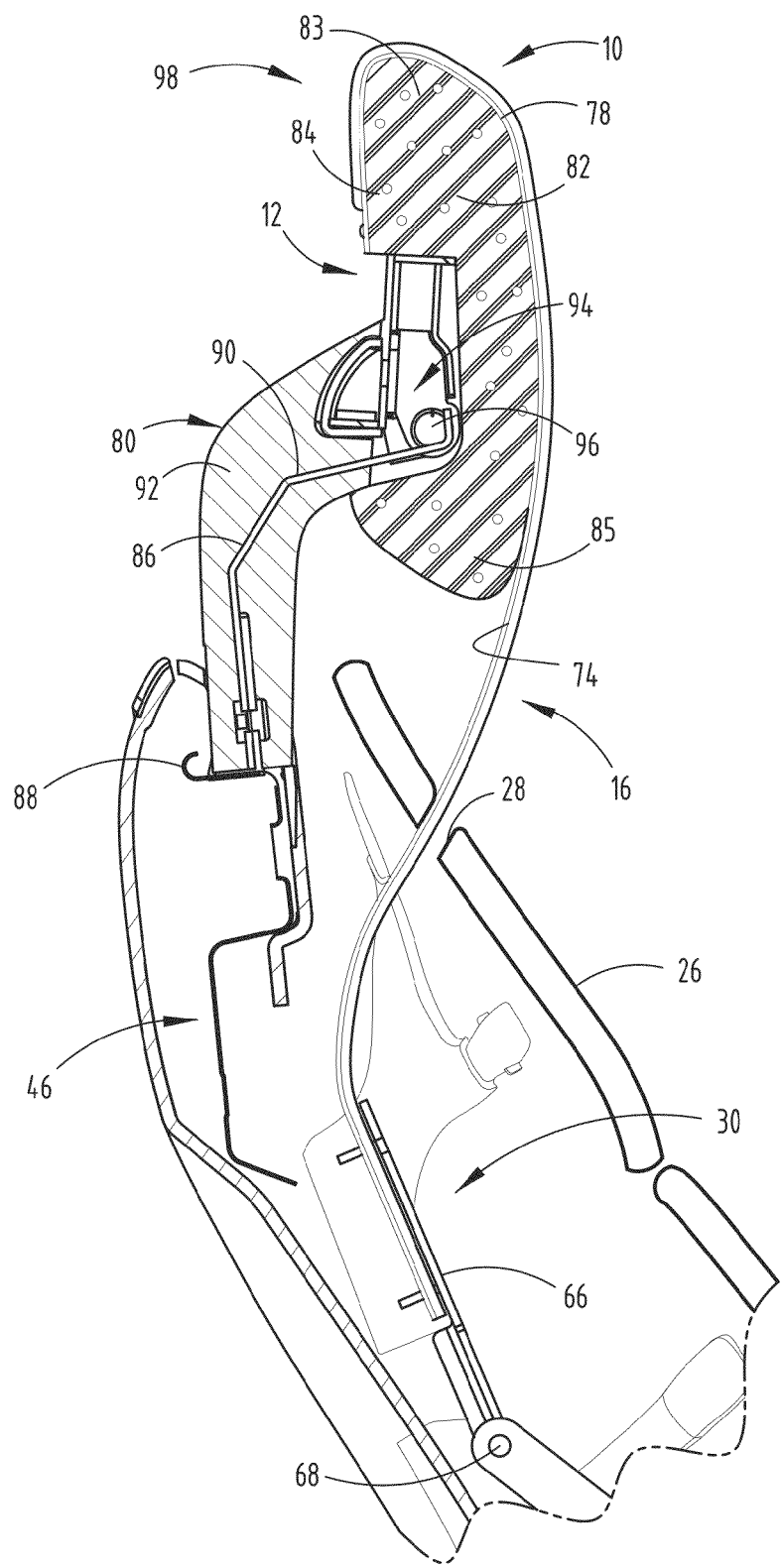
FIG. 4A is an enlarged side cross-sectional view of the headrest assembly, as shown in FIG. 4.

As shown in more detail in FIG. 4A, the support column 80 of the headrest 12 has an internal bracket 86 that protrudes vertically from a metal frame 88 of the seatback structure 46 and bends forward to a generally horizontal portion 90. The internal bracket 86 is concealed by a trim piece 92 enclosing the support column 80. The horizontal portion 90 of the internal bracket 86 operably couples with the body portion 82 of the headrest 12 about a tilt mechanism 94. The tilt mechanism 94 is configured to pivot the body portion 82 about a pin 96 coupled with the horizontal portion 90 of the internal bracket 86. The body portion 82 is spring biased to a rear position 98, such that the spring tension must be overcome to pivot the top edge 83 of the body portion 82 forward about the pin 96. The tilt mechanism 94 is configured to releasably lock the body portion 82 at various forward tilted positions about the pin 96. It is conceivable that the headrest assembly 10 may be configured without the tilt mechanism 94 to provide the headrest 12 fixed in the rear position 98.

Figure 5:
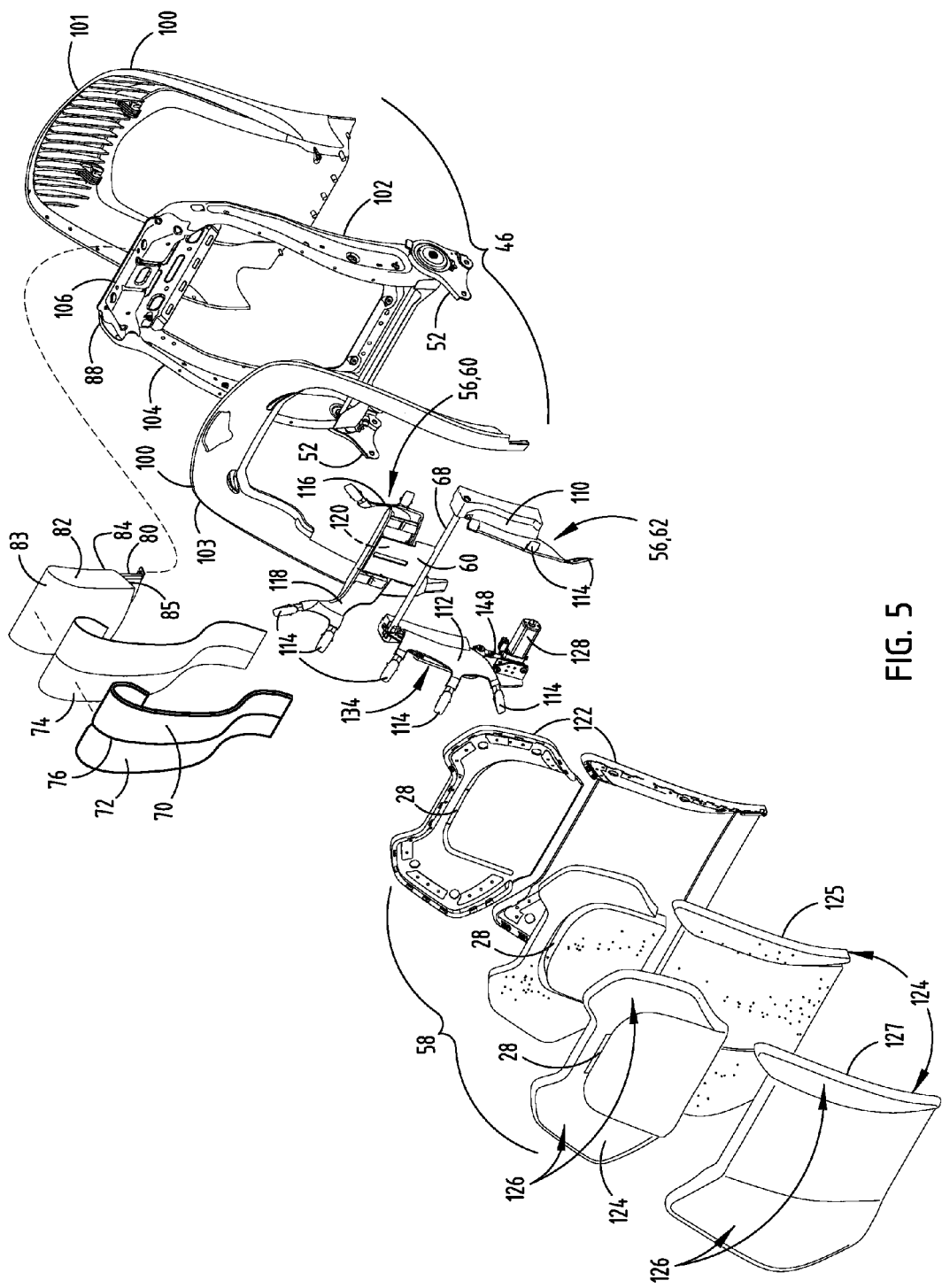
FIG. 5 is an exploded front top perspective view of the headrest assembly and a seatback of the vehicle seating assembly.
Figure 5A:
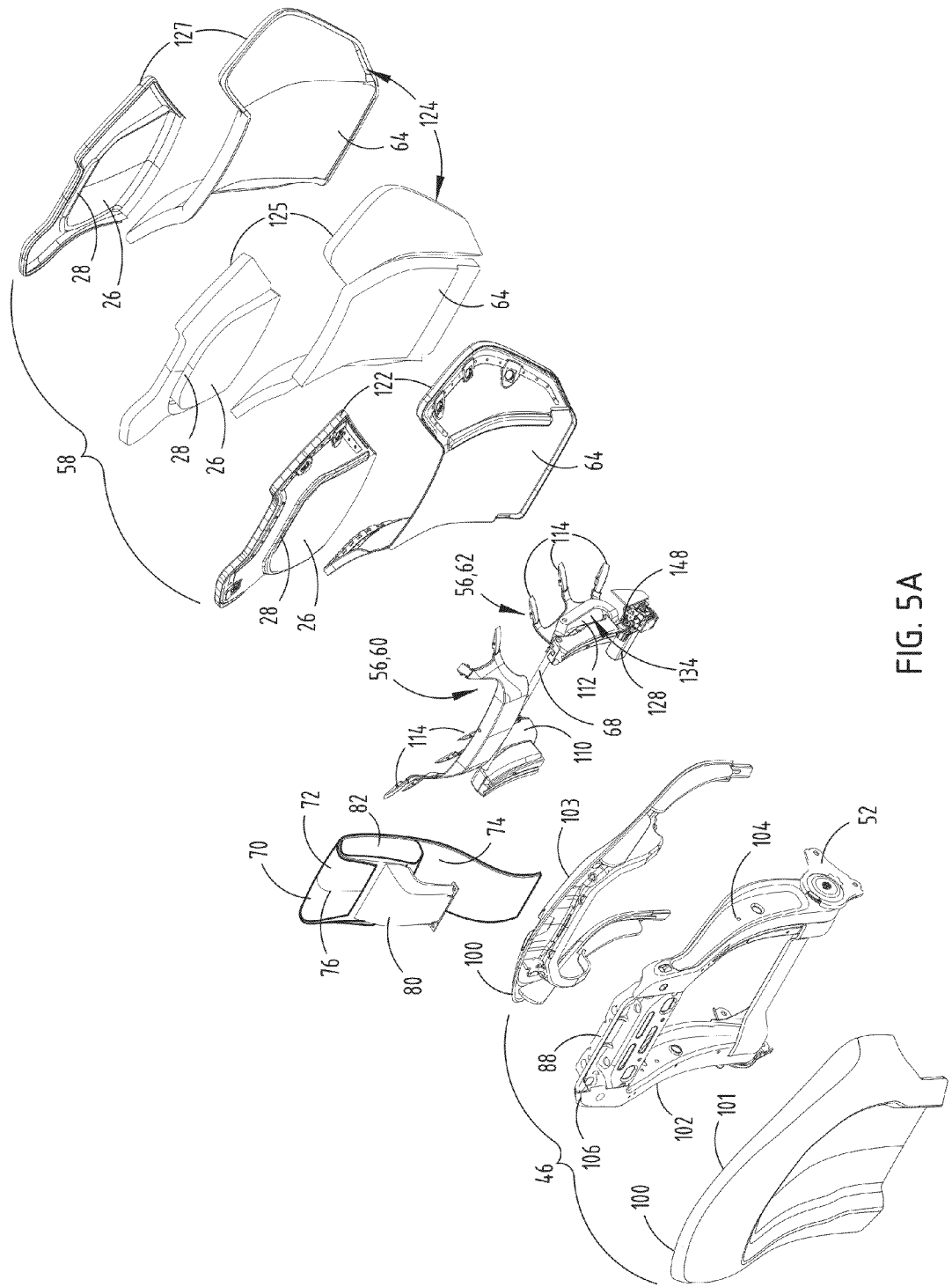
FIG. 5A is an exploded rear top perspective view of the headrest assembly and the seatback.

Referring now to FIGS. 5-5A, the metal frame 88 of the seatback structure 46 is substantially enclosed with a polymer trim shroud 100, generally concealing the edge portions of the metal frame 88. The trim shroud 100 includes a rear trim panel 101 that spans over the rear portion of the metal frame 88 and couples with a front trim piece 103 of the trim shroud 100 proximate the first and second side supports 48, 50 of the seatback structure 46. The metal frame 88 includes a first side member 102 and a second side member 104 that curve upward and rearward from the recliner brackets 52 to provide a curved shape that is similar to a passenger's spinal column. The first and second side members 102, 104 of the metal frame 88 are more robust proximate the recliner bracket 52 and taper as they extend upward to couple with a top member 106 extending orthogonally therebetween. The first and second side members 102, 104 correlate respectively with the first and second side supports 48, 50 of the seatback structure 46, and accordingly, the top member 106 correlates with the top support 54 of the seatback structure 46.

As further illustrated in FIGS. 5-5A, the suspension assembly 56 couples with and generally extends forward from the seatback structure 46 to removably couple with the passenger support 58 and to define an external peripheral gap 108 (FIG. 4) between the passenger support 58 and the seatback structure 46. The external peripheral gap 108 is configured to compress upon rearward deformation of the suspension assembly 56. The lower suspension component 62 includes a first side portion 110 and a second side portion 112 that are separate and distinct from each other. The first and second side portions 110, 112 each have three outwardly extending flex fingers 114 that couple with the lower back support 64 at the distal ends of each flex finger 114. The upper suspension component 60 of the suspension assembly 56 includes a first arm 116, a second arm 118, and a central body 120 disposed therebetween. The first and second arms 116, 118 each have a pair of flex fingers 114 that similarly couple with the upper back support 26 of the passenger support 58. The central body 120 of the first suspension component is coupled with the central bracket 66. The central bracket 66 fixedly couples with the pivot bar 68 that laterally extends between and pivotally couples with the first and second side portions 110, 112 of the lower suspension component 62. It is contemplated that the suspension assembly 56 may include more, fewer, or alternatively shaped flex fingers 114 extending from the seatback structure 46 to couple with the passenger support 58. For instance, the first and second side portions 110, 112 and the first and second arms 116, 118 may each include a single fin-shaped flex finger 114 interconnecting and substantially eliminating the three separate finger shaped flex fingers 114.

Still referring to the embodiment shown in FIGS. 5-5A, the upper back support 26 and the lower back support 64 of the passenger support 58 each include a trim carrier 122 and a cushion 124 disposed thereon. The cushion 124 has a flexible portion 125 that may conceivably include a matrix of woven fibers, an open cell foam, a closed cell foam, or other conceivable materials. A coverstock portion 127 is disposed over the flexible portion 125 and may conceivably include leather, vinyl fabric, or other upholstery materials. The trim carrier 122 removably couples with the distal ends of the flex fingers 114 in a snap-fit and friction-fit connection. The passenger support 58 has an outer edge portion that generally extends forward to form side bolsters 126 on the upper and lower back supports 26, 64. The side bolsters 126 are angled and configured to prevent lateral movement of a passenger's back relative to the passenger support 58, such as, lateral movement of an occupant's back when experiencing a centrifugal force from turning the vehicle. The upper back support 26 includes the elongated slot 28 horizontally located on an upper portion of the upper back support 26 centrally positioned between the side bolsters 126. It is conceivable that the elongated slot 28 may be alternatively positioned or configured to allow the flexible member 16 to pass through the slot. Further the elongated slot 28 may be configured between separate passenger support 58 segments, such as between the upper back support 26 and the lower back support 64, or in a space between the upper back support 26 and the headrest 12. Accordingly, it is also conceivable that the passenger support 58 may vary in shape and/or include more or fewer passenger support 58 segments consistent with or divergent from the number of potentially variable suspension components.

Figures 6, 6A:
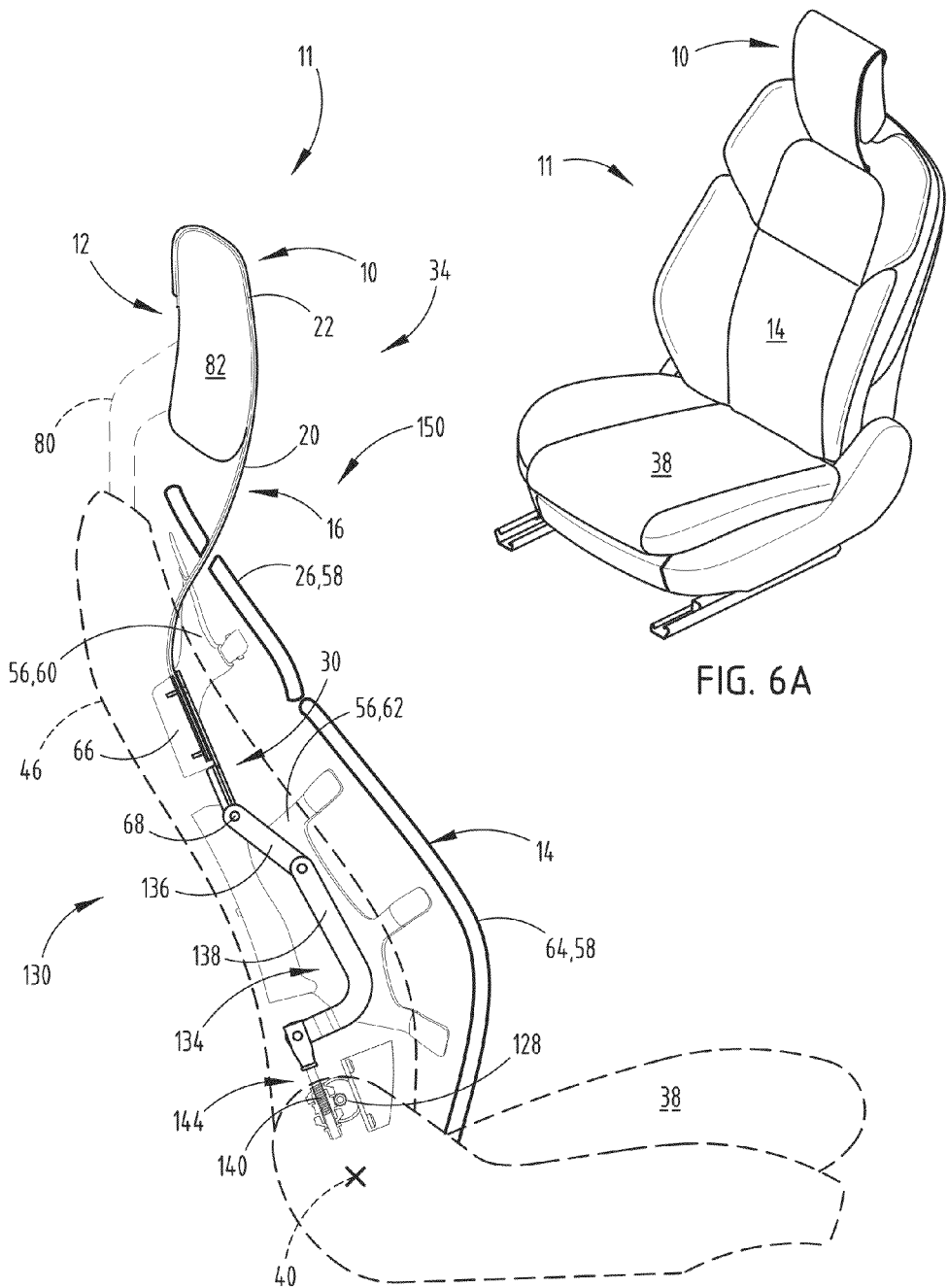
FIG. 6 is a side elevational view of the headrest assembly in a non-deployed position, having portions of the vehicle seating assembly in an upright position shown in dashed lines.
FIG. 6A is a top perspective view of the headrest assembly and the vehicle seating assembly as shown in FIG. 6.
Figures 7, 7A:
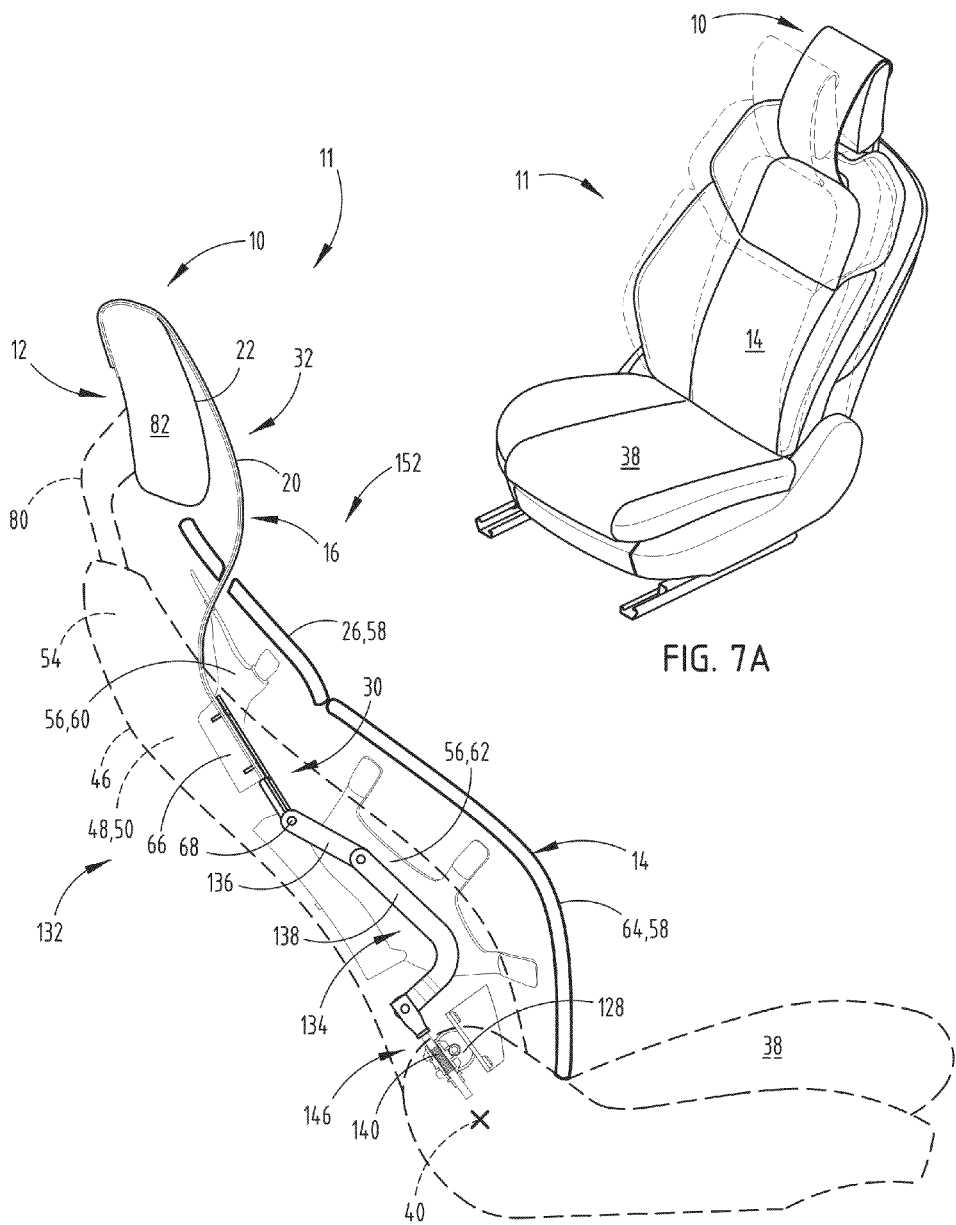
FIG. 7 is a side elevational view of the headrest assembly in a deployed position, having portions of the vehicle seating assembly in an intermediate reclined position shown in dashed lines.
FIG. 7A is a top perspective view of the headrest assembly and the vehicle seating assembly as shown in FIG. 7, having the headrest assembly in the non-deployed position and the vehicle seating assembly in the upright position shown in dashed lines.

As shown in FIGS. 5-5A, the pivot bar 68 is operably coupled with a motor 128 to rotate the pivot bar 68 between a first position 130 (FIG. 6) and a second position 132 (FIG. 7). The coupling between the motor 128 and the pivot bar 68 includes a linkage assembly 134 having a top link 136 fixedly coupled with pivot bar 68 and a bottom link 138 pivotally coupled between the top link 136 and a worm drive 140. The worm drive 140 interfaces with a gear that is attached to a drive shaft of the motor 128. The worm drive 140 linearly translates between a first position 144 (FIG. 6) and a second position 146 (FIG. 7) to drive the linkage assembly 134 and rotate the pivot bar 68. It is conceivable that the motor 128 may be directly attached to the pivot bar 68 or an alternative linkage assembly 134 or gearing arrangement may be used to facilitate the motor 128 to rotate the pivot bar 68. It is also conceivable that the pivot bar 68 may be manually rotated with an alternative arrangement.

In an upright position 148, as illustrated in FIGS. 6-6A, the seatback 14 of the vehicle seating assembly 11 includes the vehicle headrest assembly 10 having the flexible member 16 in the non-deployed position 34. The non-deployed position 34 is further defined by the upper back support 26 of the suspension assembly 56 in a rearward position 150, such that the upper back support 26 is substantially aligned with the lower back support 64 of the passenger support 58. Also, the body portion 82 of the headrest assembly 10 is in the rear position 98. As such, the intermediate portion 20 of the flexible member 16 is in abutting contact with the head support surface 22 of the headrest 12 and is similarly conforming to the contour of the head support surface 22 of the headrest 12. In this position, the worm drive 140 is also in the first position 144, aligning the linkage assembly 134 and the pivot bar 68 in the first position 130.

Moving from the upright position 148 to an intermediate reclined position 152, as shown in FIGS. 7-7A, the seatback 14 pivots rearward relative to the seat 38 about the recliner bracket 52, whereby the recliner mechanism 40 allows for the seatback 14 to pivotally move and locks the seatback 14 in the intermediate reclined position 152. In synchrony with the movement to the intermediate reclined position 152, the motor 128 is actuated to drive the worm drive 140 to the second position 146. The second position 146 of the worm drive 140 is downward from the first position 144 in alignment with the longitudinal extent of the seatback structure 46. The downward movement of the worm drive 140 to the second position 146 causes the bottom link 138 of the linkage assembly 134 to similarly move down in the seatback 14 relative to the suspension assembly 56. Accordingly the downward movement of the bottom link 138 draws the lower end of the top link 136 to pivot down and rearward away from the passenger support 58 of the vehicle seating assembly 11. The fixed connection between the upper end of the top link 136 and the pivot bar 68 causes the pivot bar 68 to rotate forward to the second position 132, which pivots the central bracket 66 and the upper component 60 of the suspension assembly 56 forward. The forward movement of the upper suspension component 60 causes the upper back support 26 to move forward and push the flexible member 16 away from abutting contact with the head support surface 22 of the headrest 12. This movement caused by the actuation system 30 operates to move the flexible member 16 from the non-deployed position 34 to the deployed position 32. Given the somewhat rigid nature of the flexible member 16, a passenger's head may rest in contact with the flexible member 16 and suspend the passenger's head away from the head support surface 22 of the headrest 12.

Figures 8, 8A:
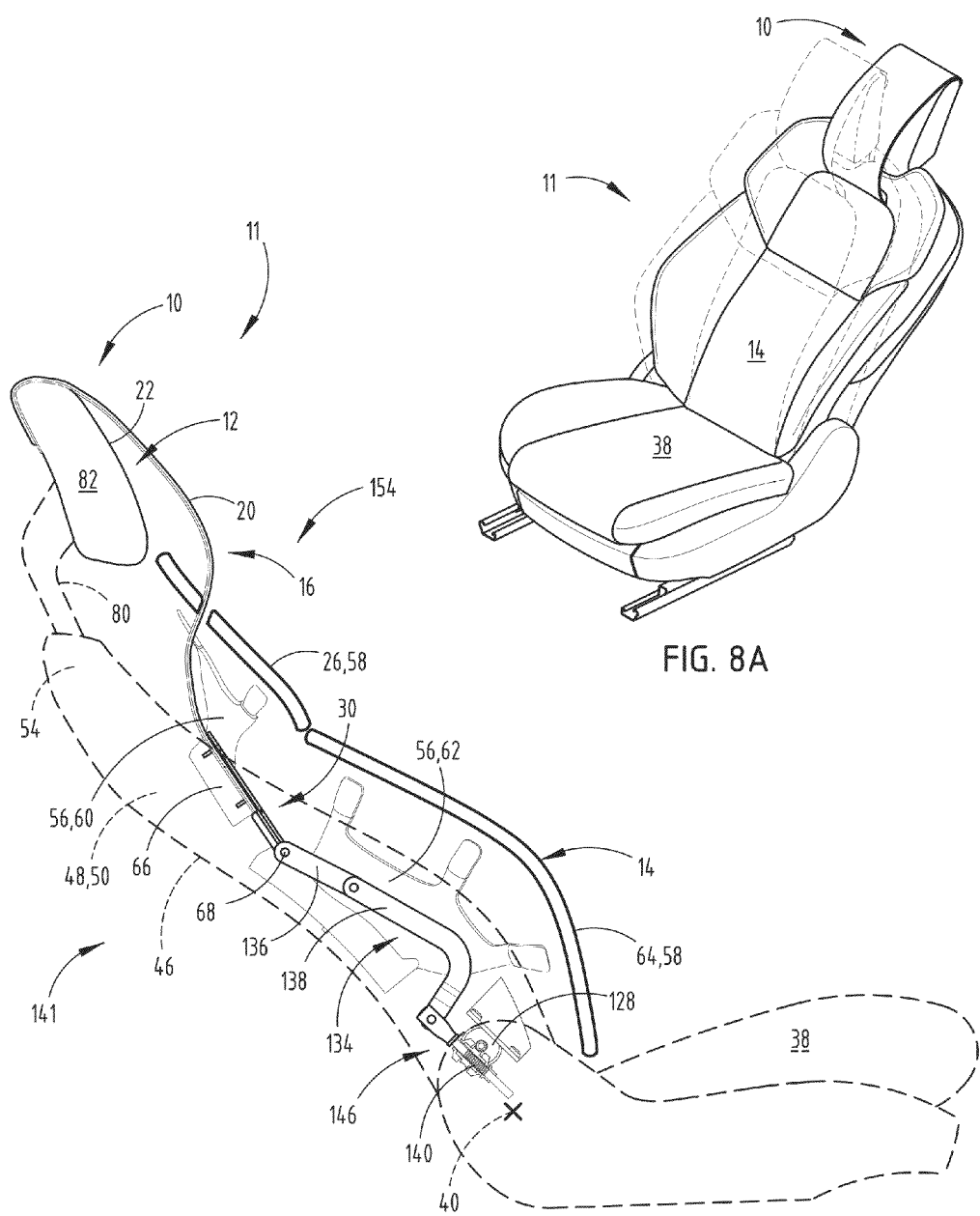
FIG. 8 is a side elevational view of the headrest assembly in a further deployed position, having portions of the vehicle seating assembly in a further reclined position shown in dashed lines.
FIG. 8A is a top perspective view of the headrest assembly and the vehicle seating assembly as shown in FIG. 8, having the headrest assembly in the deployed position and the vehicle seating assembly in the intermediate reclined position shown in dashed lines.

As further illustrated in FIGS. 8-8A, the seatback 14 is pivoted to a further reclined position 154 relative to the seat 38. The further reclined position 154, which again, is achieved by the recliner mechanism 40 allowing the seatback 14 to pivot further rearward about the recliner bracket 52. The recliner mechanism 40 may lock the seatback 14 in the further reclined position 154 relative to the seat 38. In synchronous movement with the seatback's 14 movement to the further reclined position 154, the upper suspension component 60 of the actuation system 30 is caused to pivot further forward about the pivot bar 68 drawing the flexible member 16 further away from the head support surface 22 of the headrest 12. This movement is again caused by the motor 128 actuating and linearly translating the worm drive 140 down relative to the seatback 14. This additional movement of the linkage assembly 134 results in the pivot bar 68 rotating further forward to the deployed position 32. As such, the worm drive 140 has drawn the bottom link 138 of the linkage assembly 134 downward to the extent that the top link 136 is substantially linearly aligned with the bottom link 138, preventing further downward movement of the bottom link 138 or further rotation of the pivot bar 68 forward. It is contemplated that the actuation system 30 may move the flexible member 16 between the deployed and non-deployed positions 32, 34 irrespective of the angled position of the seatback 14 relative to the seat 38. Further, it is contemplated that the headrest assembly 10 may be actuated from the non-deployed position 34 to the deployed position 32 when the seatback 14 is in a stationery upright position; and similarly, it may be actuated from the deployed to the non-deployed position 32, 34 when the seatback 14 is in a stationary reclined position. It is also conceivable that the seatback 14 may assume additional reclined and upright orientations from those illustrated, as well as the flexible member 16 may assume additional and alternative deployed and non-deployed positions 32, 34 from those illustrated herein.

Figure 9:
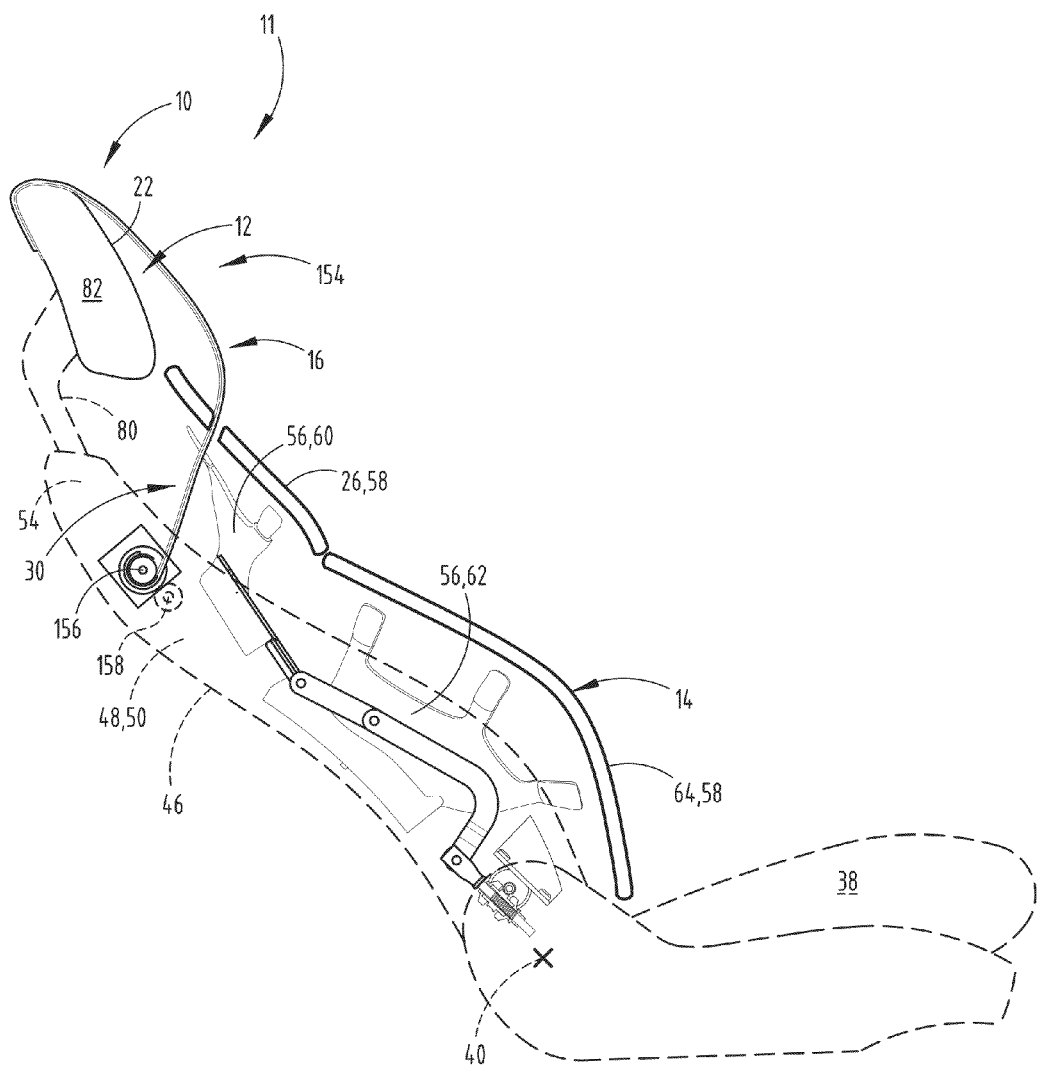
FIG. 9 is a side elevational view of an additional embodiment of the headrest assembly in a deployed position, having portions of the vehicle seating assembly in a reclined position shown in dashed lines.

In an alternative embodiment, as illustrated in FIG. 9, the actuation system 30 of the headrest assembly 10 includes a spool 156 rotatably attached between first and second side supports 48, 50 of the seatback structure 46 proximate the top support 54 of the seatback structure 46. Other similarly numbered components of the vehicle headrest assembly 10 and vehicle seating assembly 11 include similar features and characteristics as those in the previously described embodiment. The spool 156 includes a cylindrical shape and the flexible member 16 is fixedly coupled with the curved surface of the spool 156, such that the spool 156 may be rotated about its axis to wrap the flexible member 16 around the curved surface thereof. In this embodiment, the actuation system 30 may operate to rotate the spool 156, such as by actuating an alternative motor 158 coupled with the spool 156, to wind and unwind the flexible member 16 that is surroundingly wrapped around the spool 156, thereby moving the flexible member 16 between the non-deployed and deployed positions 34, 32. As also contemplated, such an additional embodiment of the actuation system 30 may move the flexible member 16 between the deployed and non-deployed positions 32, 34 irrespective of the position of the upper back support 26 or the reclined position of the seatback 14.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle headrest assembly comprising:
   a headrest operably coupled to a vehicle seatback and including a head support surface;
   a flexible member including:
      a top portion operably coupled to the headrest;
      an intermediate portion adjacent the head support surface; and
      a lower portion;

an upper back support disposed on the vehicle seatback and defining an elongated slot through which the flexible member extends; and an actuation system operably coupled to the lower portion of the flexible member, wherein the actuation system operates to move the flexible member through the slot between a deployed position and a non-deployed position.

2. The vehicle headrest assembly of claim 1, further comprising:
a coverstock disposed over the flexible member.

3. The vehicle headrest assembly of claim 1, wherein the flexible member includes an elongated spring steel element.

4. The vehicle headrest assembly of claim 1, wherein the lower portion is operably coupled to a pivot bar that extends across the vehicle seatback.

5. The vehicle headrest assembly of claim 4, wherein the actuation system includes a motor which is configured to rotate the pivot bar between a first position corresponding to the deployed position and a second position corresponding to the non-deployed position.

6. The vehicle headrest assembly of claim 5, wherein the motor is operably coupled to a worm drive that linearly translates between a first position and a second position.

7. A vehicle headrest assembly comprising:
a headrest operably coupled to a vehicle seatback;
a flexible member including:
a top portion operably coupled to the headrest; and
first and second independent resilient elements defining an intermediate slit therebetween; and
an actuation system operably coupled to a lower portion of the flexible member, wherein the actuation system operates to move the flexible member between a deployed position and a non-deployed position.

8. The vehicle headrest assembly of claim 7, wherein the headrest is operable between forward and rearward positions.

9. The vehicle headrest assembly of claim 7, wherein the flexible member extends over a top portion of the headrest.

10. The vehicle headrest assembly of claim 7, wherein the flexible member is operably coupled to an upper seatback support assembly that is operable between an extended position and a retracted position.

11. The vehicle headrest assembly of claim 7, wherein the flexible member extends between an upper portion of the vehicle seatback and the headrest.

12. The vehicle headrest assembly of claim 11, wherein the upper portion of the vehicle seatback generally defines a horizontal slot through which the lower portion of the flexible member extends.

13. A vehicle headrest comprising:
a body portion including a head support surface; and
a flexible member including:
a top portion operably coupled to the body portion;
a flexible intermediate portion proximate the head support surface; and
a lower portion operably coupled to a pivoting member of an actuation system, wherein operation of the actuation system moves the flexible intermediate portion of the flexible member a predetermined distance away from the head support surface, and further wherein the pivoting member includes, a pivot bar disposed in a vehicle seatback.

14. The vehicle headrest of claim 13, wherein the flexible member extends over a top portion of the headrest.

15. The vehicle headrest of claim 13, further comprising:
a support column that operably couples a rear wall of the body portion to a vehicle seatback.

16. The vehicle headrest of claim 13, further comprising:
a coverstock disposed over the flexible member.

17. The vehicle headrest of claim 13, wherein the flexible member includes an elongated spring steel element.

18. The headrest assembly of claim 13, wherein the body portion is operable between forward and rearward positions.

* * * * *